(12) United States Patent
Zeng et al.

(10) Patent No.: US 8,902,731 B2
(45) Date of Patent: Dec. 2, 2014

(54) METHOD, NETWORK CARD, AND COMMUNICATION SYSTEM FOR BINDING PHYSICAL NETWORK PORTS

(71) Applicant: Huawei Technologies Co., Ltd., Shenzhen (CN)

(72) Inventors: Yungang Zeng, Chengdu (CN); Lin Peng, Hangzhou (CN); Zhongjun Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 97 days.

(21) Appl. No.: 13/711,411

(22) Filed: Dec. 11, 2012

(65) Prior Publication Data

US 2013/0100798 A1 Apr. 25, 2013

Related U.S. Application Data (63) Continuation of application No. PCT/CN2012/070129, filed on Jan. 9, 2012.

(30) Foreign Application Priority Data

Jan. 30, 2011 (CN) .......................... 2011 1 0033471

(51) Int. Cl.
| | |
|---|---|
| *H04L 1/00* | (2006.01) |
| *H04L 12/24* | (2006.01) |
| *H04L 12/46* | (2006.01) |
| *H04L 29/12* | (2006.01) |

(52) U.S. Cl.
CPC ........ *H04L 41/0803* (2013.01); *H04L 12/4641* (2013.01); *H04L 41/0668* (2013.01); *H04L 61/6077* (2013.01)
USPC .......................................... 370/218; 370/254

(58) Field of Classification Search
USPC ................................. 370/218, 254
See application file for complete search history.

(56) References Cited

U.S. PATENT DOCUMENTS

| | | | |
|---|---|---|---|
| 2002/0071386 A1* | 6/2002 | Gronke | ......................... 370/217 |
| 2002/0184387 A1 | 12/2002 | Yamaya et al. | |

(Continued)

FOREIGN PATENT DOCUMENTS

| | | |
|---|---|---|
| CN | 1509030 A | 6/2004 |
| CN | 1556625 A | 12/2004 |

(Continued)

OTHER PUBLICATIONS

Written Opinion of the International Searching Authority issued in corresponding PCT Patent Application No. PCT/CN2012/070129, mailed Apr. 12, 2012, 10 pages.

(Continued)

*Primary Examiner* — Sai-Ming Chan
(74) *Attorney, Agent, or Firm* — Brinks Gilson & Lione (57) ABSTRACT

A method for binding physical network ports for network communications creates in an application layer virtual ports that correspond to virtual network cards. Each virtual port is capable of being bound in the application layer with other created virtual ports. Multiple physical network ports, which need to be bound, are added to the created virtual ports. To receive or transmit a packet, one or more available physical network ports are selected according to a configured mode for receiving or transmitting the packet. If the configured mode is a server load balancing mode, a physical network port that corresponds to a quintuple of the packet is identified, and the packet is received or transmitted through the identified physical network port. When no corresponding physical port is found, a physical network port with minimum traffic is selected for receiving or transmitting the packet.

11 Claims, 6 Drawing Sheets

(56) References Cited

U.S. PATENT DOCUMENTS

2005/0094633 A1    5/2005    Varanasi et al.
2005/0120160 A1*  6/2005    Plouffe et al. ............... 711/1
2006/0282591 A1   12/2006   Krithivas
2008/0285555 A1   11/2008   Ogasahara

FOREIGN PATENT DOCUMENTS

CN         101330370 A    12/2008
CN         101640620 A     2/2010
CN         102137169 A     7/2011
EP         1297678 B1     8/2005

OTHER PUBLICATIONS

Office Action issued in corresponding Chinese Patent Application No. 201110033471.9, mailed Jul. 19, 2013, 10 pages.
Office Action issued in corresponding Chinese Patent Application No. 201110033471.9, mailed Dec. 27, 2012.
International Search Report issued in corresponding PCT Patent Application No. PCT/CN2012/070129, mailed Apr. 12, 2012.
Extended European Search Report issued in corresponding European Patent Application No. 12739728.9, mailed May 6, 2013.

* cited by examiner

METHOD, NETWORK CARD, AND COMMUNICATION SYSTEM FOR BINDING PHYSICAL NETWORK PORTS

CROSS-REFERENCE TO RELATED APPLICATIONS

This application is a continuation of International Application No. PCT/CN2012/070129, filed on Jan. 9, 2012, which claims priority to Chinese Patent Application No. 201110033471.9, filed on Jan. 30, 2011, both of which are hereby incorporated by reference in their entireties.

FIELD

The present disclosure relates to the field of communications technologies, and in particular, to a method, a network card, and a communication system for binding physical network ports.

BACKGROUND

In the field of communications, in order to improve network quality as well as the reliability and bandwidth of a service, multiple physical network ports of a communication device are usually logically bound together and used as one network device.

Figure 1:
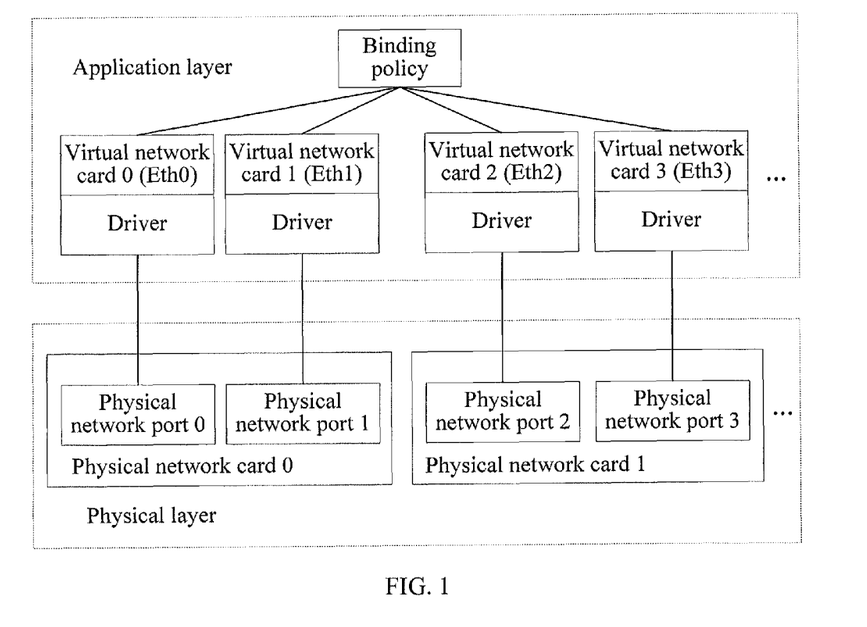
FIG. 1 is a schematic diagram of network port binding in the prior art.

Referring to FIG. 1, FIG. 1 is a schematic diagram of network port binding in the prior art, and the whole system includes two layers in terms of logical functions: an application layer and a physical layer. The physical layer includes multiple physical network cards (such as a physical network card 0 and a physical network card 1 shown in FIG. 1), and each physical network card has some physical network ports (for example, the physical network card 0 has physical network ports 0 and 1). The physical network ports here not only represent a part of interface components that are on the network card and connected to other physical components, but further include function modules (such as PHY (Physical Layer, physical layer) chips) that process data of the physical network ports. The "physical network port" here may be construed as a function module located on the network card and having a data processing capability, and corresponds to a data channel.

Each network port in the network card is virtualized into a virtual network card (which is indicated by Eth plus a digital label here) in the application layer (such as an operating system) through the processing of a driver and relevant software, for example, the physical network port 0 is virtualized into Eth0, and a physical network port 2 is virtualized into Eth2.

After the physical network ports are virtualized into virtual network cards, these virtual network cards may be bound to form a network device (the network device is not shown in the figure) through a certain binding policy. Because each virtual network card here corresponds to a physical network port, "binding the virtual network cards" may be construed as "binding the physical network ports" and these two statements are not strictly distinguished here.

Binding multiple physical network ports facilitates uniform processing in the application layer, thereby implementing load balancing and redundancy backup.

During the implementation of the present disclosure, the inventor finds that the prior art at least has the following defects:

In the prior art, in the binding of the application layer, binding is performed on the network ports only once, for example, once a load balancing mode is used for binding, a redundancy backup mode cannot be used. While in a practical application, to better meet service demands, binding usually needs to be performed twice on the network ports, for example, redundancy backup is implemented for two network port groups and load balancing is implemented for multiple network ports in each group. Therefore, the prior art fails to implement the requirement of binding twice, thereby failing to better meet the service demands.

SUMMARY

The present disclosure provides a method, a network card, and a communication system for binding physical network ports, so as to implement the requirement of binding twice and better meet service demands. The technical solutions are described as follows:

A method for binding physical network ports includes:

creating a virtual port, where the virtual port corresponds to a virtual network card in an application layer and is capable of being bound, in the application layer, with other created virtual ports through an application layer software;

adding multiple physical network ports, which need to be bound, to the created virtual port;

when communication of the physical network ports in the virtual port is normal, determining the physical network ports in normal communication as available physical network ports; and when a packet needs to be received and/or transmitted, selecting one or more physical network ports from the available physical network ports according to a configured mode to receive and/or transmit the packet.

A network card includes:

a creation module, configured to create a virtual port, where the virtual port corresponds to a virtual network card in an application layer and is capable of being bound, in the application layer, with other created virtual ports through an application layer software;

an addition module, configured to add multiple physical network ports, which need to be bound, to the created virtual port;

a determining module, configured to: when communication of the physical network ports in the virtual port is normal, determine the physical network ports in normal communication as available physical network ports; and a packet transceiver module, configured to: when a packet needs to be received and/or transmitted, select one or more physical network ports from the available physical network ports according to a configured mode to receive and/or transmit the packet.

A communication system includes a CPU (Central Processing Unit, central processing unit) and a network card, where the network card includes multiple physical network ports;

the CPU runs an application layer program and is configured to process service data; and the network card is configured to create a virtual port, where the virtual port corresponds to a virtual network card in an application layer and is capable of being bound, in the application layer, with other created virtual ports through an application layer software; add multiple physical network ports, which need to be bound, to the created virtual port; when communication of the physical network ports in the virtual port is normal, determine the physical network ports in normal communication as available physical network ports; and when a packet needs to be received and/or transmitted, select one or more physical network ports from the available physical network ports according to a configured mode to receive and/or transmit the packet.

In the present disclosure, a virtual port is created, multiple physical network ports that need to be bound are added to the virtual port, and physical network ports in normal communication in the virtual port are determined as available physical network ports. When a packet needs to be received and/or transmitted, one or more physical network ports are selected from the available physical network ports according to a configured mode to receive and/or transmit the packet. The virtual port corresponds to a virtual network card in the application layer and is capable of being bound, in the application layer, with other created virtual ports through an application layer software. In this way, multiple virtual ports are bound into one virtual network card in the application layer, thereby implementing the requirement of binding twice and better meeting the service demands.

DETAILED DESCRIPTION OF THE EMBODIMENTS

To make the objectives, technical solutions, and advantages of the present disclosure more comprehensible, the following describes the embodiments of the present disclosure in further detail with reference to the accompanying drawings.

Embodiment 1

Figure 2:
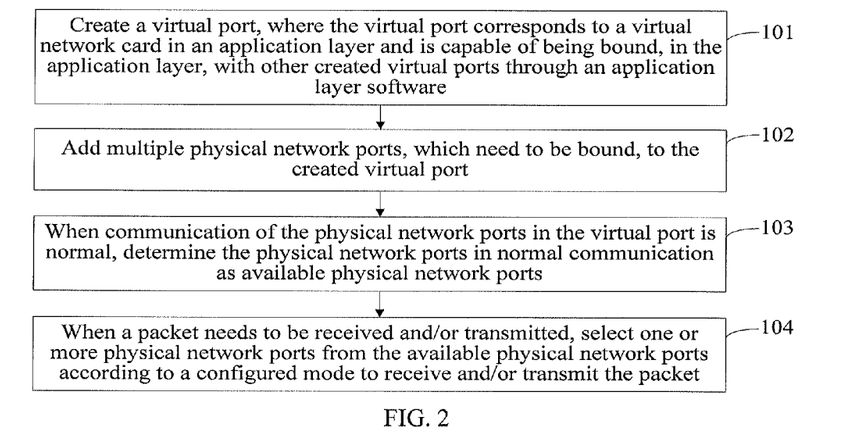
FIG. 2 is a flow chart of a method for binding physical network ports according to Embodiment 1 of the present disclosure.

As shown in FIG. 2, an embodiment of the present disclosure provides a method for binding physical network ports, which is applied in a network card device and includes:

Step 101: Create a virtual port, where the virtual port corresponds to a virtual network card in an application layer and is capable of being bound, in the application layer, with other created virtual ports through an application layer software.

Step 102: Add multiple physical network ports, which need to be bound, to the created virtual port.

Step 103: When communication of the physical network ports in the virtual port is normal, determine the physical network ports in normal communication as available physical network ports.

Step 104: When a packet needs to be received and/or transmitted, select one or more physical network ports from the available physical network ports according to a configured mode to receive and/or transmit the packet.

In the embodiment of the present disclosure, a virtual port is created, multiple physical network ports that need to be bound are added to the virtual port, and physical network ports in normal communication are determined as available physical network ports. When a packet needs to be received and/or transmitted, one or more physical network ports are selected from the available physical network ports according to a configured mode to receive and/or transmit the packet. The virtual port corresponds to a virtual network card in the application layer and is capable of being bound, in the application layer, with other created virtual ports through an application layer software. Therefore, multiple virtual ports may also be bound into one network device in the application layer, thereby implementing the requirement of binding twice and better meeting service demands.

Embodiment 2

Figure 3:
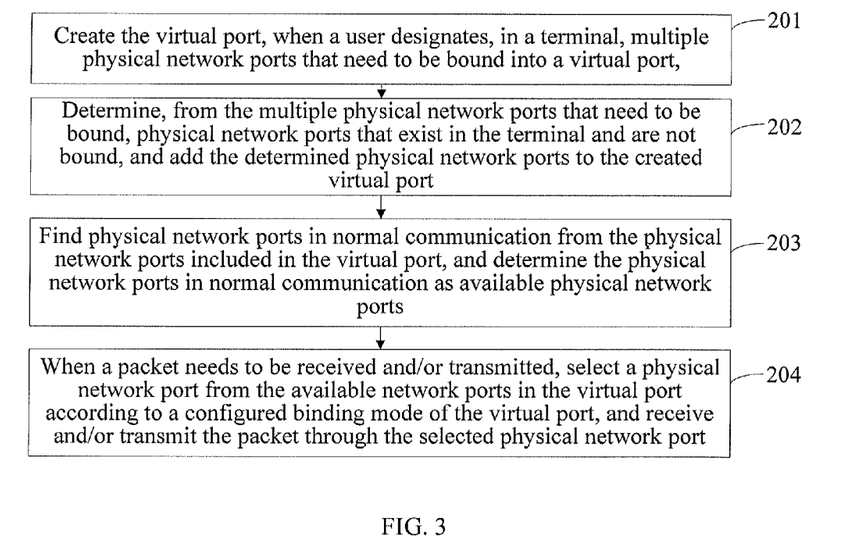
FIG. 3 is a flow chart of a method for binding physical network ports according to Embodiment 2 of the present disclosure.

As shown in FIG. 3, an embodiment of the present disclosure provides a method for binding physical network ports. A performing subject of this embodiment is a network card of a terminal, and the method includes:

Step 201: Create a virtual port when a user designates, in the terminal, multiple physical network ports that need to be bound into a virtual port.

A physical layer of the terminal includes multiple physical network ports, and when the user needs to bind multiple physical network ports into the virtual port in the terminal, the user designates, in the terminal, the multiple physical network ports that need to be bound. In addition, the user further configures a binding mode in the terminal, and furthermore, the binding mode configured by the user is recorded in the created virtual port. The binding mode may be a load balancing mode, a redundancy backup mode, or an SLB (Server Load Balancing, Server Load Balancing) mode.

The "virtual port" here may be regarded as an intermediate processing module between the physical network ports and an application layer. On one hand, the virtual port is configured to bind multiple physical network ports (that is, to perform uniform processing on data of the multiple physical network ports in a certain manner); on the other hand, each virtual port corresponds to a virtual network card in the application layer. Such a case is similar to that each physical port corresponds to a virtual network card in an application layer in the prior art, and the application layer processes each virtual port as a physical port. Therefore, multiple virtual ports (virtual network cards) created in the physical layer may be bound in the application layer through an existing binding method, so as to obtain a network device. It may be seen that, the virtual port has performed binding on the multiple physical network ports once, and the virtual ports are bound once again in the application layer, so that binding the physical network ports twice may be implemented, thereby better meeting service demands.

Specifically, when the virtual port here is implemented by software, the virtual port may be implemented by a structure (for example, C-language-based), or an object (for example, object-oriented programming languages, including Java, C++, and so on), or other similar means according to features of different programming languages, which is not limited here.

Step 202: Determine, from the multiple physical network ports that need to be bound, physical network ports that exist in the physical layer and are not bound, and add the determined physical network ports to the created virtual port.

In this embodiment, it is assumed that the virtual port may include bound physical network ports and available physical network ports. The "available physical network ports" here refer to ports in normal communication and may be used to receive and/or transmit a packet, and may be classified into "available receiving network ports" and "available transmitting network ports" for better management in implementation.

In specific implementation, if the virtual port is a structure or an object, the network ports that need to be bound and the available physical network ports are a member variable of the structure or the object, for example, multiple relevant physical network ports may be recorded in a member variable, where a type of the member variable is an array or a linked list. Definitely, other software implementation methods may be used to record the bound physical network ports and available physical network ports, which are not limited in the embodiment of the present disclosure.

Based on the foregoing software implementation method, adding the determined physical network ports to the virtual port means adding relevant identifiers (such as network port numbers, or numbers of PHYs corresponding to the network ports) of the physical network ports to a member variable of a virtual port object.

In addition, to better implement dynamic management, when the virtual port is designed, a data structure that is easy to manage may be used to represent relevant network ports, for example, a linked list is used to manage the network ports, so that network ports are conveniently added or deleted.

For the convenience of description, specific software implementation of the bound physical network ports and the available physical network ports is not described below; instead, it is considered that the virtual port has a "list of physical network ports" and a "list of available physical network ports" (the available physical network ports may be classified into a "list of available receiving network ports" and a "list of available transmitting network ports") in logical sense, where the two lists record the bound physical network ports and the available physical network ports respectively.

Step 203: Find physical network ports in normal communication from the physical network ports included in the virtual port, and determine the physical network ports in normal communication as available physical network ports.

Specifically, traversing is started from a first physical network port in the virtual port according to the "list of physical network ports", and it is judged whether communication of the traversed physical network port is normal. If the communication is normal, it is determined that the traversed physical network port is an available physical network port, and if a physical network port not traversed exists, a next physical network port is traversed. If the communication is abnormal and a physical network port not traversed exists, a next physical network port is traversed. Through the foregoing process, the available physical network ports may be determined and the determined available physical network ports are added to the list of available physical network ports (or the "list of available receiving network ports" and the "list of available transmitting network ports").

Whether communication of network ports is normal may be judged through a link (link) status of each network port. Each physical network port in a physical network card has a link status; if communication of a physical network port is normal, the link status of the physical network port is a link up (link up) status, and if communication of a physical network port is abnormal, the link status of the physical network port is a link down (link down) status.

Figure 4:
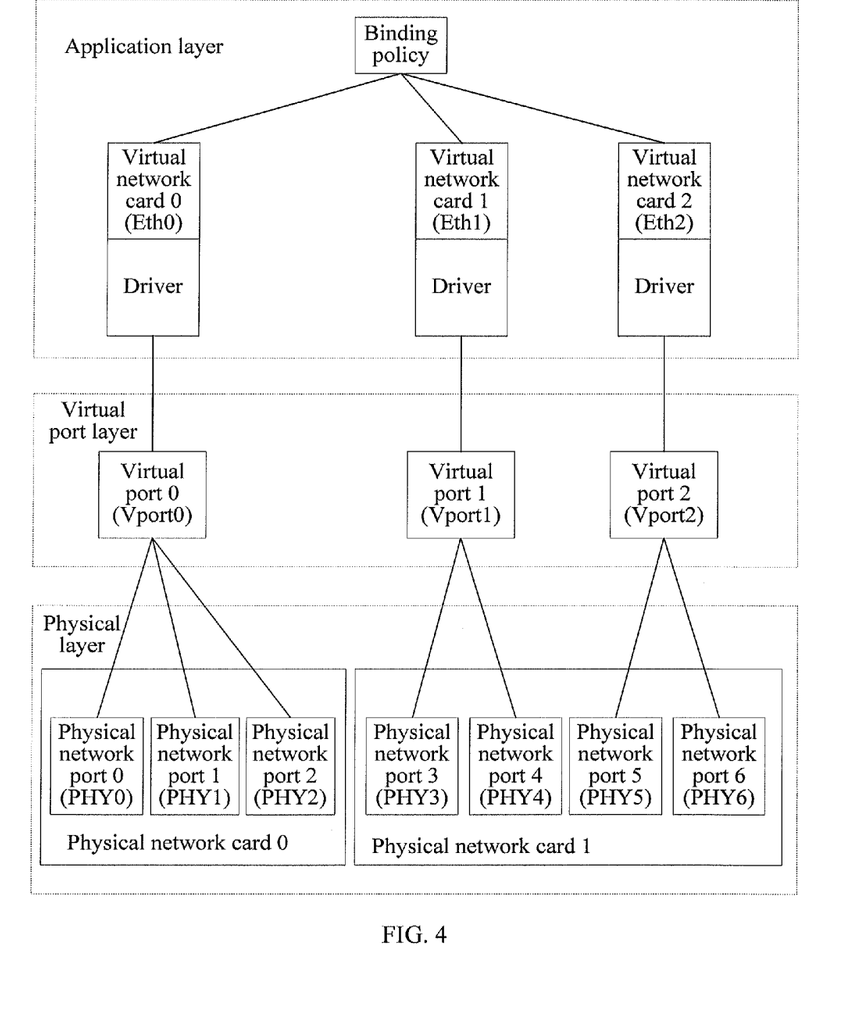
FIG. 4 is a schematic diagram of network port binding according to Embodiment 2 of the present disclosure.

As shown in FIG. 4, multiple physical network ports in the physical layer may be bound into a virtual port (indicated by Vport plus a digital label herein), the bound virtual port is located in a virtual port layer, and each virtual port in the virtual port layer corresponds to a virtual network card in the application layer. An existing binding method may be utilized to perform secondary binding of multiple virtual ports, so as to implement the requirement of binding twice and better meet service demands.

Step 204: When a packet needs to be received and/or transmitted, select a physical network port from the available physical network ports in the virtual port according to a configured binding mode of the virtual port, and receive and/or transmit the packet through the selected physical network port.

The "binding mode" here may also be recorded in the virtual port as a member variable, and by judging a value of the variable corresponding to the "binding mode", one or more physical network ports are selected according to a certain policy to receive and/or transmit the packet.

Specifically, when the binding mode is a load balancing mode, each available physical network port included in the virtual port is selected, and the packet is received and/or transmitted through each selected physical network port.

When the binding mode is a redundancy mode, a physical network port is designated from the available physical network ports included in the virtual port. If communication of the designated physical network port is normal, the packet is received and/or transmitted through the designated physical network port, and if communication of the designated physical network port is abnormal, a new physical network port in normal communication is designated from remaining physical network ports, and the packet is received and/or transmitted through the designated physical network port.

When the binding mode is an SLB mode, a quintuple is extracted from the packet that needs to be received and/or transmitted. Correspondence between stored quintuples of packets and physical network ports is searched according to the extracted quintuple to check whether a corresponding physical network port exists. If the corresponding physical network port exists, the packet is received and/or transmitted through the found physical network port, and if no corresponding physical network port exists, a physical network port with minimum packet traffic is selected from the available physical network ports included in the virtual port, the packet is received and/or transmitted through the selected physical network port, and the extracted quintuple and the selected physical network port are recorded in the correspondence between quintuples of packets and physical network ports.

The quintuple of the packet may include a source IP (Internet Protocol, internet protocol) address, a destination IP address, a source port number, a destination port number, and a protocol number of the packet.

Furthermore, physical network ports included in each virtual port in the virtual port layer may also be checked and checking operations on each virtual port may specifically be: checking at regular time whether communication of the physical network ports in the virtual port is normal, if the communication is normal, determining the checked physical network ports as available physical network ports, and if the communication is abnormal, determining the checked physical network ports as unavailable physical network ports, and updating each corresponding list according to a checking result.

In the embodiment of the present disclosure, primary binding of the physical network ports is implemented in the physical network card by creating a virtual port in the physical network card, and at the same time, each created virtual port corresponds to a virtual network card in the application layer. Therefore, binding of the virtual ports may also be implemented in the application layer, finally binding the physical network ports twice is implemented, thereby better meeting service demands.

In addition, if a data structure such as a linked list is used to manage the physical network ports, a physical network port that need to be bound may be conveniently and dynamically added or deleted subsequently, thereby better meeting the service demands (for example, the number of the bound physical network ports may be increased when a high-bandwidth service needs to be performed). In addition, such dynamic adjustment is merely to add some members and does not conflict with a service processing process. Therefore, such dynamic adjustment does not interrupt a service and better meets the service demands.

In addition, through the embodiment of the present disclosure, not only balancing and redundancy processing is performed on each physical port by utilizing the virtual port, but also traffic control and ACL (Access Control List, Access Control List) control may be performed on the port, thereby implementing QoS (Quality of Service, quality of service) control based on the virtual port and making the implementation of the QoS control more flexible. For example, a variable for counting transmitting and/or receiving tokens is added to member variables of the virtual port and at the same time, a timing processing function for placing a token into the member variable at regular time is added. A traffic condition is judged subsequently according to a value of the variable for counting transmitting and/or receiving tokens, thereby flexibly implementing the traffic control on the virtual port.

Embodiment 3

Based on the foregoing embodiments, an embodiment of the present disclosure provides a method for binding physical network ports. In this embodiment, it is taken as an example that a virtual port includes at least a list of physical network ports, a list of available transmitting network ports, and a list of available receiving network ports, and description is provided in several stages, where the list of available transmitting network ports and the list of available receiving network ports may also be generally referred to as a "list of available physical network ports".

I. Creating Stage

Figure 5:
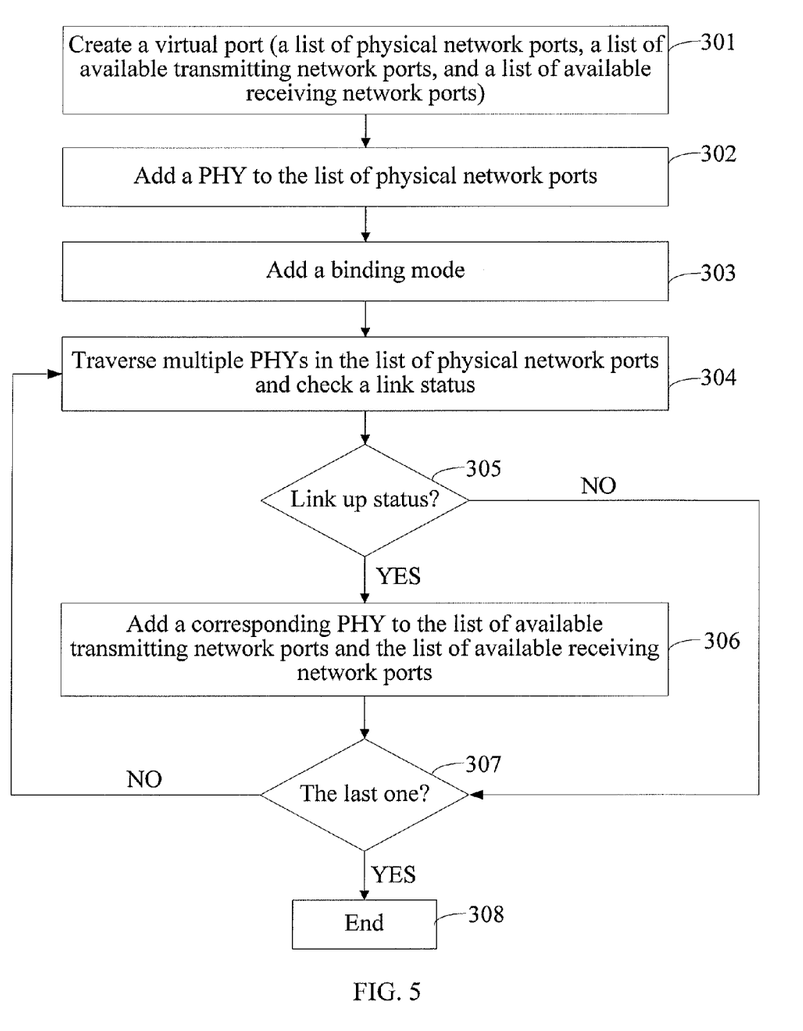
FIG. 5 is a flow chart of a method for binding physical network ports according to Embodiment 3 of the present disclosure.

This stage mainly accomplishes steps such as virtual port creation and initialization. Referring to FIG. 5, this stage includes:

Step 301: Create a virtual port.

When multiple physical network ports designated by a user need to be bound into a virtual port according to a configured binding mode, the virtual port is created. The virtual port includes at least a list of physical network ports, a list of available transmitting network ports, and a list of available receiving network ports. The list of physical network ports is used to record each physical network port that needs to be bound and is included in the virtual port, the list of available transmitting network ports is used to record each physical network port that is used for transmitting a packet and included in the virtual port, and the list of available receiving network ports is used to record each physical network port that is used for receiving a packet and included in the virtual port.

Step 302: Add a PHY.

It is described in the foregoing that a physical network port may be regarded as a function module, each function module (physical network port) corresponds to a processing chip PHY, and adding a physical network port may also be construed as adding a PHY to the list of physical network ports of the virtual port.

Step 303: Add a binding mode.

Specifically, a member variable that represents the binding mode is set in the virtual port, and "adding a binding mode to the virtual port" may be construed as "assigning a value, which represents the binding mode, to the variable".

Furthermore, before a configured binding mode is recorded, it may be further determined whether a network card supports the binding mode. If a network card supports the binding mode, the binding mode is recorded in the virtual port, and if a network card does not support the binding mode the step of binding the virtual port is ended and storage space occupied by the virtual port is released.

The network card may support all binding modes, or only support several binding modes. A network card that only supports several binding modes instead of all binding modes further maintains a list of binding modes, where the list of binding modes is used to record binding modes supported by the network card.

Correspondingly, operations of determining whether the network card supports the configured binding mode may be: searching the list of binding modes maintained by the network card to check whether the configured binding mode exists. If the configured binding mode exists, it is determined that the network card supports the configured mode, and if the configured binding mode does not exist, it is determined that the network card does not support the configured binding mode.

Step 304: Traverse multiple PHYs in the list of physical network ports and check a link status.

In the embodiment of the present disclosure, it is determined whether communication of a physical network port is normal by checking the link status of the PHY.

Step 305: Judge whether the status is a link up status; if yes, perform step 306; otherwise, perform step 307.

Step 306: Add the corresponding PHY to the list of available transmitting network ports and the list of available receiving network ports.

Step 307: Judge whether the PHY is the last one; if yes, perform step 308 to end the process; if not, go on to perform step 304.

Through the foregoing steps, the virtual port is created and the PHYs (physical network ports) in normal communication are added to the list of available transmitting network ports and the list of available receiving network ports.

II. Maintenance Stage

This stage checks a communication status of each network port (PHY) in the list of available network ports by traversing at regular time, so as to add the network port to or delete the network port from the list of available transmitting/receiving network ports.

Figure 6:
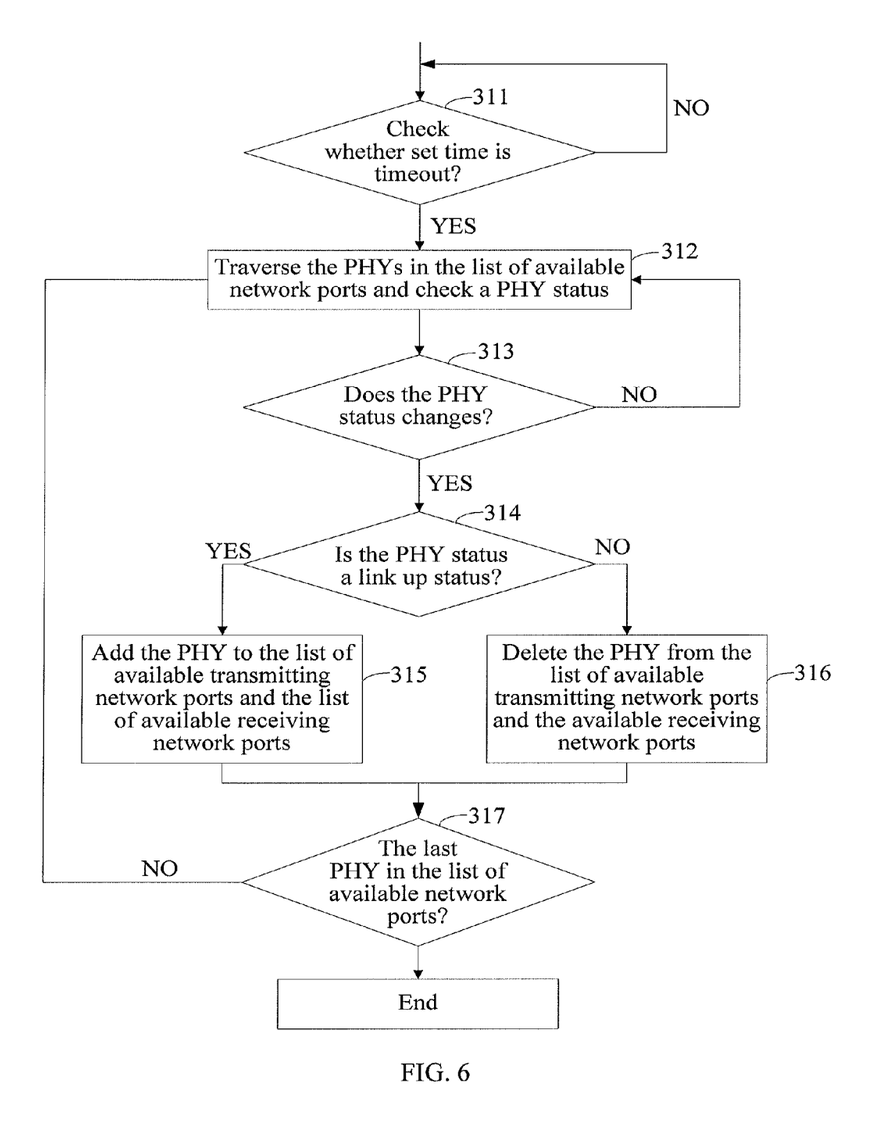
FIG. 6 is a flow chart of a method for binding physical network ports according to Embodiment 3 of the present disclosure.

Referring to FIG. 6, this stage includes the following steps:

Step 311: Check whether set time is timeout; if yes, perform step 312; if not, keep performing step 311.

Step 312: Traverse PHYs in the list of available network ports and check a PHY status.

Step 313: Judge whether the PHY status changes; if yes, perform step 314; if not, go on to perform step 312.

Step 314: Judge whether the PHY status is link up; if yes, perform step 315; if not, perform step 316.

Step 315: Add the PHY (physical network port) to the list of available transmitting network ports and the list of available receiving network ports, and perform step 317 subsequently.

If the PHY status changes and the current status is link up, it indicates that original communication is abnormal and current communication is normal; therefore, the PHY is added to the list of available transmitting/receiving network ports.

Step 316: Delete the PHY (physical network port) from the list of available transmitting network ports and the available receiving network ports, and perform step 317 subsequently.

If the PHY status changes and the current status is not link up, it indicates that original communication is normal and current communication is abnormal; therefore, the PHY is deleted from the list of available transmitting/receiving network ports.

Step 317: Judge whether the PHY is the last PHY in the list of available network ports; if yes, end the process; if not, go on to perform step 312.

Through regular detections, the status of each list may be updated at any time, so as to be adapted to application demands of services.

III. Data Processing Stage

This stage is a data processing stage, that is, when receiving a packet, the network card completes packet data processing according to a corresponding mode.

Figure 7:
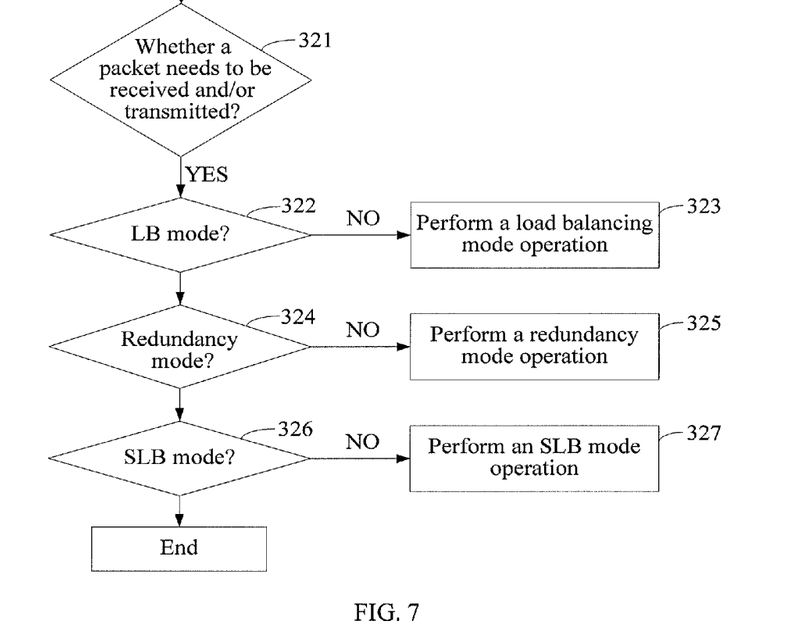
FIG. 7 is a flow chart of a method for binding physical network ports according to Embodiment 3 of the present disclosure.

Referring to FIG. 7, this stage includes the following steps:

Step 321: Judge whether a packet needs to be received and/or transmitted; if yes, perform step 322; if not, keep performing step 321.

Step 322: Judge whether a mode is an LB (Load Balancing) mode; if yes, perform step 323; if not, perform step 324.

Step 323: Perform a load balancing mode operation and end the subsequent process.

Step 324: Judge whether a mode is a redundancy mode; if yes, perform step 325; if not, perform step 326.

Step 325: Perform a redundancy mode operation, and end the subsequent process.

Step 326: Judge whether a mode is an SLB (server load balancing) mode; if yes, perform step 327; if not, end the process.

Step 327: Perform an SLB (server load balancing) mode operation and end the subsequent process.

The sequence of the foregoing judgments is not limited. The judgment of whether the mode is the redundancy mode may be performed before the judgment of whether the mode is the LB mode. The mode may be determined by judging a value of a member variable that represents the mode in the virtual port.

Operations of the foregoing involved modes are described respectively in detail below:

1. LB Mode

Each physical network port in the list of available receiving network ports in the virtual port is obtained and the packet is received through each of the obtained physical network ports, that is, each physical network port receives data, and in this way the load balancing is implemented.

2. Redundancy Mode

A physical network port in normal communication is designated from the list of available transmitting/receiving network ports of the virtual port and the packet is received and/or transmitted (which means received or transmitted, or received and transmitted at the same time) through the designated physical network port.

Specifically, a physical network port is designated from the list of available transmitting/receiving network ports of the virtual port, and it is judged whether communication of the designated physical network port is normal; if yes, the packet is received and/or transmitted through the designated physical network port; if not, a new physical network port is designated from remaining physical network ports in the list of available transmitting/receiving network ports and the foregoing process is repeated until a physical network port in normal communication is designated to receive and/or transmit the packet.

That is, in the redundancy mode, only one network port is used first and if a problem occurs, another network port is used, thereby implementing the backup.

3. SLB Mode

A quintuple of the packet is extracted from the packet and correspondence between stored quintuples of packets and transceiver physical network ports is searched according to the extracted quintuple of the packet.

If a corresponding physical network port is found, the packet is received and/or transmitted by utilizing the found physical network port, so as to guarantee that the same flow is received and/or transmitted through the same port.

If no corresponding physical network port is found, a physical network port with minimum packet traffic is selected from the lists of available receiving and/or transmitting network ports and the selected physical network port is utilized to receive and/or transmit the packet, thereby implementing the load balancing.

In addition, the extracted quintuple of the packet and the selected physical network port may be recorded in the correspondence between quintuples of packets and transceiver physical network ports.

Through the embodiment of the present disclosure, primary binding of each physical network port is implemented on the network card, and at the same time, the virtual ports in the present disclosure are bound once again in the application layer, so that binding the physical network ports twice is finally implemented, thereby better meeting service demands.

Embodiment 4

Figure 8:
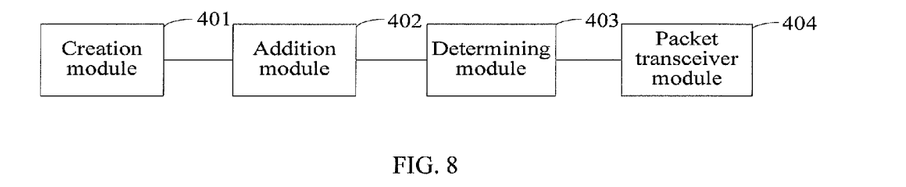
FIG. 8 is schematic diagram of a network card according to Embodiment 4 of the present disclosure.

As shown in FIG. 8, an embodiment of the present disclosure provides a network card, which includes:

a creation module 401, configured to create a virtual port, where the virtual port corresponds to a virtual network card in an application layer and is capable of being bound, in the application layer, with other created virtual ports through an application layer software;

an addition module 402, configured to add multiple physical network ports, which need to be bound, to the created virtual port;

a determining module 403, configured to: when communication of the physical network ports in the virtual port is normal, determine the physical network ports in normal communication as available physical network ports; and a packet transceiver module 404, configured to: when a packet needs to be received and/or transmitted, select one or more physical network ports from the available physical network ports according to a configured mode to receive and/or transmit the packet.

The addition module 402 is specifically configured to determine, from the multiple physical network ports that need to be bound, physical network ports that exist in a physical layer and are not bound, and add the determined physical network ports to the created virtual port.

Furthermore, the network card further includes:

a checking module, configured to check at regular time whether communication of the physical network ports in the virtual port is normal; if the communication is normal, determine the checked physical network ports as available physical network ports; if the communication is abnormal, determine the checked physical network ports as unavailable physical network ports.

The packet transceiver module 404 is specifically configured to: if the configured mode is a load balancing mode, receive and/or transmit the packet through the available physical network ports.

The packet transceiver module 404 is specifically configured to: if the configured mode is a redundancy backup mode, designate a physical network port from the available physical network ports; if communication of the designated physical network port is normal, receive and/or transmit the packet through the designated physical network port; if the communication of the designated physical network port is abnormal, designate a new physical network port in normal communication from the available physical network ports to receive and/or transmit the packet.

The packet transceiver module 404 includes:

a search unit, configured to: if the configured mode is an SLB mode, search correspondence between stored quintuples of packets and physical network ports according to a quintuple of the packet to check whether a corresponding physical network port exists; and a selection unit, configured to: if the corresponding physical network port exists, receive and/or transmit the packet through the found physical network port; if no corresponding physical network port exists, select a physical network port with minimum traffic from the available physical network ports and receive and/or transmit the packet through the selected physical network port.

If a physical network port of the virtual port needs to be added, the physical network port that needs to be added is added to the virtual port. If a physical network port of the virtual port needs to be deleted, the physical network port that needs to be deleted is deleted from the virtual port. If a binding mode of the virtual port needs to be changed, the binding mode recorded by the virtual port is updated to the changed binding mode. In this way, the obtained virtual port may change the number and the binding mode of the physical network ports as needed.

In the embodiment of the present disclosure, a virtual port is created in the physical layer, multiple physical network ports that need to be bound are added to the created virtual port, physical network ports in normal communication in the virtual port are found, and the physical network ports in normal communication are determined as available physical network ports. When a packet needs to be received and/or transmitted, the packet may be received and/or transmitted through the available physical network port in the virtual port, where the virtual port corresponds to a virtual network card in the application layer and is capable of being bound, in the application layer, with other created virtual ports through an application layer software. In this way, the requirement of binding the physical network ports twice is implemented, thereby better meeting service demands.

It should be noted that, in the embodiment of the present disclosure, each module is a logical function module and does not represent a concrete hardware module. Each module in the embodiment of the present disclosure may be implemented on the basis of existing hardware processing units of a network card, which is not elaborated here.

Embodiment 5

Figure 9:
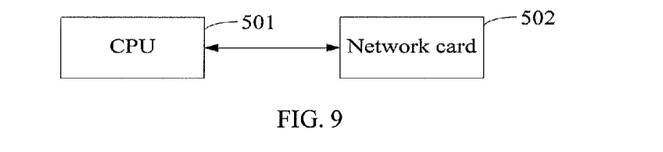
FIG. 9 is schematic diagram of a communication system according to Embodiment 5 of the present disclosure.

As shown in FIG. 9, an embodiment of the present disclosure provides a communication system, which includes a CPU 501 and a network card 502, where the network card 502 includes multiple physical network ports.

The CPU 501 is configured to run application layer programs to process service data.

The network card 502 is configured to create a virtual port, where the virtual port corresponds to a virtual network card in an application layer and is capable of being bound, in the application layer, with other created virtual ports through an application layer software; add multiple physical network ports, which need to be bound, to the created virtual port; when communication of the physical network ports in the virtual port is normal, determine the physical network ports in normal communication as available physical network ports; and when a packet that needs to be received and/or transmitted, select one or more physical network ports from the available physical network ports according to a configured mode to receive and/or transmit the packet.

In the embodiment of the present disclosure, a virtual port is created in the physical layer, multiple physical network ports that need to be bound are added to the created virtual port, physical network ports in normal communication in the virtual port are found, and the physical network ports in normal communication are determined as available physical network ports. When a packet needs to be received and/or transmitted, the packet may be received and/or transmitted through the available physical network port in the virtual port, where the virtual port corresponds to a virtual network card in the application layer and is capable of being bound, in the application layer, with other created virtual ports through an application layer software. In this way, the requirement of binding the physical network ports twice is implemented, thereby better meeting service demands.

The foregoing functions accomplished by a network card device may be implemented on the basis of a network card hardware device in the prior art, for example, the foregoing functions may be implemented by adding program codes corresponding to the embodiment of the present disclosure to an existing network card processor. Specifically, logical division of the network card device may be performed according to Embodiment 4. Alternatively, persons skilled in the art may divide (for example, create different function modules through software) function modules of the network card device in other similar manners, thereby implementing the functions of the network card.

All or part of the contents in the technical solution provided in the foregoing embodiments may be implemented by software programs, and the software programs are stored in readable storage media such as a computer hard disk, an optical disk, or a floppy disk.

The foregoing describes exemplary embodiments of the present disclosure and is not intended to limit the present disclosure. Any modification, equivalent replacement, or improvement made without departing the spirit and principle of the present disclosure shall fall within the protection scope of the present disclosure.

What is claimed is:

1. A method for binding physical network ports, comprising:

creating a virtual port, wherein the virtual port corresponds to a virtual network card in an application layer that is capable of being bound, in the application layer, with other created virtual ports through application layer software;

adding multiple physical network ports, which need to be bound, to the created virtual port;

when communications of the physical network ports in the virtual port are normal, identifying the physical network ports as being available; and when a packet needs to be received or transmitted, selecting one or more physical network ports from the available physical network ports according to a configured mode to receive or transmit the packet;

wherein the step of selecting one or more physical network ports from the available physical network ports comprises:

if the configured mode is a server load balancing mode, searching correspondence between stored quintuples of packets and physical network ports according to a quintuple of the packet to determine whether a corresponding physical network port exists; and if the corresponding physical network port exists, receiving or transmitting the packet through the determined physical port;

if no corresponding physical network port exists, selecting a physical network port with minimum traffic from the available physical network ports, and receiving or transmitting the packet through the selected physical network port.

2. The method according to claim 1, wherein adding of the multiple physical network ports, which need to be bound, to the created virtual port comprises:

determining, from the multiple physical network ports that need to be bound, physical network ports that exist in a physical layer that are not bound; and adding the determined physical network ports to the created virtual port.

3. The method according to claim 1, wherein after identifying that the physical network ports are available, the method further comprises:

checking at regular time intervals whether communications of the physical network ports in the virtual port are normal;

if the communications are normal, determining that the physical network ports are available; and if the communications are abnormal, determining that the physical network ports are unavailable.

4. The method according to claim 1, wherein selection of one or more physical network ports from the available physical network ports according to the configured mode to receive or transmit the packet comprises:

if the configured mode is a load balancing mode, receiving or transmitting the packet through the available physical network ports.

5. The method according to claim 1, wherein selection of one or more physical network ports from the available physical network ports according to the configured mode to receive or transmit the packet comprises:

if the configured mode is a redundancy backup mode, designating a physical network port from the available physical network ports; and if communication of the designated physical network port is normal, receiving or transmitting the packet through the designated physical network port;

if communication of the designated physical network port is abnormal, designating a new physical network port from the available physical network ports to receive and/or transmit the packet.

6. A network card, comprising:

a creation module configured to create a virtual port, wherein the virtual port corresponds to a virtual network card in an application layer and that is capable of being bound, in the application layer, with other created virtual ports through application layer software;

an addition module configured to add, to the created virtual port, multiple physical network ports that need to be bound;

a determining module configured to:

when communications of the physical network ports in the virtual port are normal, identify the physical network ports in normal communication as being available; and a packet transceiver module configured to: when a packet needs to be received or transmitted, select one or more available physical network ports according to a configured mode to receive or transmit the packet;

wherein the packet transceiver module comprises:

a search unit configured to: if the configured mode is a server load balancing mode, search correspondence between stored quintuples of packets and physical network ports according to a quintuple of the packet to determine whether a corresponding physical network port exists; and a selection unit configured to: if the corresponding physical network port exists, receive or transmit the packet through the determined physical network port, and if no corresponding physical network port exists, select a physical network port with minimum traffic from the available physical network ports, and receive or transmit the packet through the selected physical network port.

7. The network card according to claim 6, wherein the addition module is configured to determine, from the multiple physical network ports that need to be bound, physical network ports that exist in a physical layer that are not bound, and add the determined physical network ports to the created virtual port.

8. The network card according to claim 6, further comprising:

a checking module configured to check at regular time intervals whether communications of the physical network ports in the virtual port are normal; if the communications are normal, identify the physical network ports as being available; if the communications are abnormal, determine the physical network ports as being unavailable.

9. The network card according to claim 6, wherein the packet transceiver module is configured to: if the configured mode is a load balancing mode, receive or transmit the packet through the available physical network ports.

10. The network card according to claim 6, wherein the packet transceiver module is configured to:

if the configured mode is a redundancy backup mode, designate a physical network port from the available physical network ports;

if communication of the designated physical network port is normal, receive or transmit the packet through the designated physical network port;

if the communication of the designated physical network port is abnormal, designate a new physical network port from the available physical network ports to receive or transmit the packet.

11. A communication system, comprising:
a central processing unit CPU; and
a network card, wherein the network card comprises multiple physical network ports;

wherein the CPU is configured to run application layer programs to process service data; and the network card is configured to:

create a virtual port, wherein the virtual port corresponds to a virtual network card in an application layer that is capable of being bound, in the application layer, with other created virtual ports through application layer software;

add, to the created virtual port, multiple physical network ports, which need to be bound;

when communications of the physical network ports in the virtual port are normal, identify the physical network ports as being available; and when a packet needs to be received or transmitted, select one or more physical network ports from the available physical network ports according to a configured mode to receive or transmit the packet;

wherein the operation of selecting one or more physical network ports from the available physical network ports comprises:

if the configured mode is a server load balancing mode, searching correspondence between stored quintuples of packets and physical network ports according to a quintuple of the packet to determine whether a corresponding physical network port exists; and if no corresponding physical network port exists, receiving or transmitting the packet through the determined physical port;

if no corresponding physical network port exists, selecting a physical network port with minimum traffic from the available physical network ports, and receiving or transmitting the packet through the selected phial network port.

* * * * *